United States Patent [19]

Gillies et al.

[11] 3,926,060
[45] Dec. 16, 1975

[54] GYROSCOPIC APPARATUS

[75] Inventors: Barrie Andrew Gillies, Crowthorne; Frederick Granville Simpson, Woodley, both of England

[73] Assignee: Sperry Rand Limited, Bracknell, England

[22] Filed: May 10, 1973

[21] Appl. No.: 359,049

[30] Foreign Application Priority Data

May 12, 1973 United Kingdom............... 22475/73

[52] U.S. Cl. .................. 74/5.1; 74/5.14; 74/5.7
[51] Int. Cl. ............... G01c 19/24; G01c 19/26
[58] Field of Search................... 74/5.1, 5.14, 5.7

[56] References Cited
UNITED STATES PATENTS

| | | | |
|---|---|---|---|
| 2,674,891 | 4/1954 | Konet et al. | 74/5.1 |
| 2,685,206 | 8/1954 | Fillebrown | 74/5.1 |
| 2,726,550 | 12/1955 | Radkowski et al. | 74/5.1 |
| 2,807,169 | 9/1957 | Fischer | 74/5.14 |
| 3,508,447 | 4/1970 | Shirley | 74/5.1 |

*Primary Examiner*—Charles J. Myhre
*Assistant Examiner*—William C. Anderson
*Attorney, Agent, or Firm*—Howard P. Terry

[57] ABSTRACT

A gyroscopic apparatus including at least one two-degree-of-freedom gyroscope having a sensitive element mounted in an inner gimbal rotatable about an axis, an outer gimbal rotatable about an axis orthogonal to the inner gimbal axis, and a caging mechanism comprising a plunger releasably operable which engages an extension of the inner gimbal axis to effect caging, the line of action of the plunger passes through the inner gimbal axis and is parallel to the outer gimbal axis. Thus a single caging mechanism serves to lock both the inner and outer gimbals in the caged position and the line of action of the plunger is such that no precessional torques are applied to the gyroscope as a result of disengagement of the caging mechanism.

20 Claims, 13 Drawing Figures

GYROSCOPIC APPARATUS

BACKGROUND OF THE INVENTION

1. Field of the Invention

This invention relates to gyroscopic apparatus and more particularly to such apparatus having a caging mechanism, that is a mechanism operable to lock at least one gimbal of the apparatus in a predetermined position. The term "gyroscopic apparatus" is intended to cover gyroscopes per se and such devices as inertial platforms, for example, employing one or more gyroscopes. For convenience, the invention will be discussed as applied to gyroscopes per se.

2. Prior Art

There are many different forms of caging mechanism known in the prior art but they tend to suffer from the disadvantage that they are comparatively inaccurate as to the precise caging position of the gimbal(s) and often a separate caging mechanism is required for each gimbal. The lack of caging accuracy is acceptable in many cases where the caging mechanism is employed during non-use or transit of the gyroscope as a means merely to prevent the gimbals from being subjected to excessive movement which might result in damage. Further the use of a low accuracy caging mechanism may be acceptable when employed to approximately position the gimbals prior to erection of the gyroscope in the setting-up procedure normally employed in making the gyroscope ready for operation. There are certain applications of gyroscopes, such as missle navigation, in which a highly accurate caging mechanism is required.

According to the present invention both the inner and outer gimbals are locked in predetermined positions by the action of a single caging mechanism comprised of a plunger the line of action of which is such that no precessional torques are applied to the gyroscope as a result of disengagement of the caging mechanism. The plunger may engage an appropriately shaped recess in a disc or other member associated with the extension of the inner gimbal axis, the recess being positioned to suit the desired orientation of the inner gimbal, and hence the outer gimbal, in its caged position thereby providing precise positional caging of the gimbals.

SUMMARY OF THE INVENTION

The present invention is a gyroscopic apparatus including at least one 2-degree-of-freedom gyroscope having a sensitive element mounted in an inner gimbal rotatable about an axis, an outer gimbal rotatable about an axis orthogonal to the inner gimbal axis, and a caging mechanism comprising a plunger means releasably operable to engage an extension of the inner gimbal axis to effect caging; the line of action of the plunger passes through the inner gimbal axis and is parallel to the outer gimbal axis.

The plunger means of the caging mechanism may be in the form of a slide having a main body and mounted in a housing for limited movement relative thereto, movement of the slide being effected through a projection carried by a member mounted on the main body of the slide by a resilient mounting and movable with the main body throughout the extent of the movement of the main body necessary to effect caging, and further movable relative to the main body of the slide against the resilient mounting whereby the caging pressure of the plunger is increased.

Preferably, the slide is mounted in the housing on springs which are compressed upon movement of the slide to the caged position. The springs automatically return the slide to the uncaged position upon release of the projection. The slide may be mounted on ball or roller bearings which are preloaded to effectively eliminate backlash transverse to the direction of movement of the slide and this, coupled with the removal of backlash in the direction of slide movement by the resilient mounting, holds the slide within extremely close tolerances such that the apparatus can be caged and uncaged to an unusually high order of accuracy, thereby ensuring repeatability.

Movement of the slide may be effected by a cam, the projection serving as the cam follower. The actual cam surface of the cam is preferably in the form of a parallel-sided cam track the width of which is held within close tolerance with respect to the cam follower which engages the cam track. In this way, a limitation is imposed on the movement of the plunger, in the uncaged position, under shock or vibration conditions. The projection forming the cam follower preferably has a ball race which engages the cam track and this, together with the use of a slide mounted in bearings, reduces friction to a minimum and permits reliable uncaging following long periods of storage in the caged position. The drive to the cam may be of many different forms but a particularly advantageous arrangement has been found to be the use of a worm gear to drive the cam, which acts as a worm wheel, the worm itself being driven by a motor, such as a stepper motor, through a gear train.

If a twin gyroscope arrangement is involved in which inner gimbal axes of the respective gyroscopes are aligned, the cams associated with the respective gyroscopes may be mounted back-to-back, and a common drive employed to rotate the cams, thereby providing very compact caging mechanisms for the gyroscopes.

The gyroscopic apparatus may include an electrical switch operable to indicate whether the apparatus is caged or uncaged. The switch may include a first member carrying a pair of electrical contacts, a second member carrying an electrically-conductive strip operable to short the pair of contacts in the closed switch position and may be biassed to the closed position. A second member of the switch may be mounted on a carrier for movement toward and away from the first member. The arrangement is such that in changing from the switch closed to the switch open position, the carrier is first movable relative to both the first member and the second member and then engages the second member to move the latter away from the first member to open the switch. The switch is preferably embodied in the plunger of the caging mechanism and the carrier may be in the form of a rod provided with a shoulder for engagement with the second member to effect movement thereof away from the first member. In this arrangement, the second member may be in the form of a disc and the electrically-conductive strip may be annular.

A space reference unit comprising a pair of two-degree-of-freedom gyroscopes each embodying the present invention will now be described in greater detail, by way of example, with reference to the accompanying drawings, in which:

DESCRIPTION OF THE PREFERRED EMBODIMENT

Figure 1:
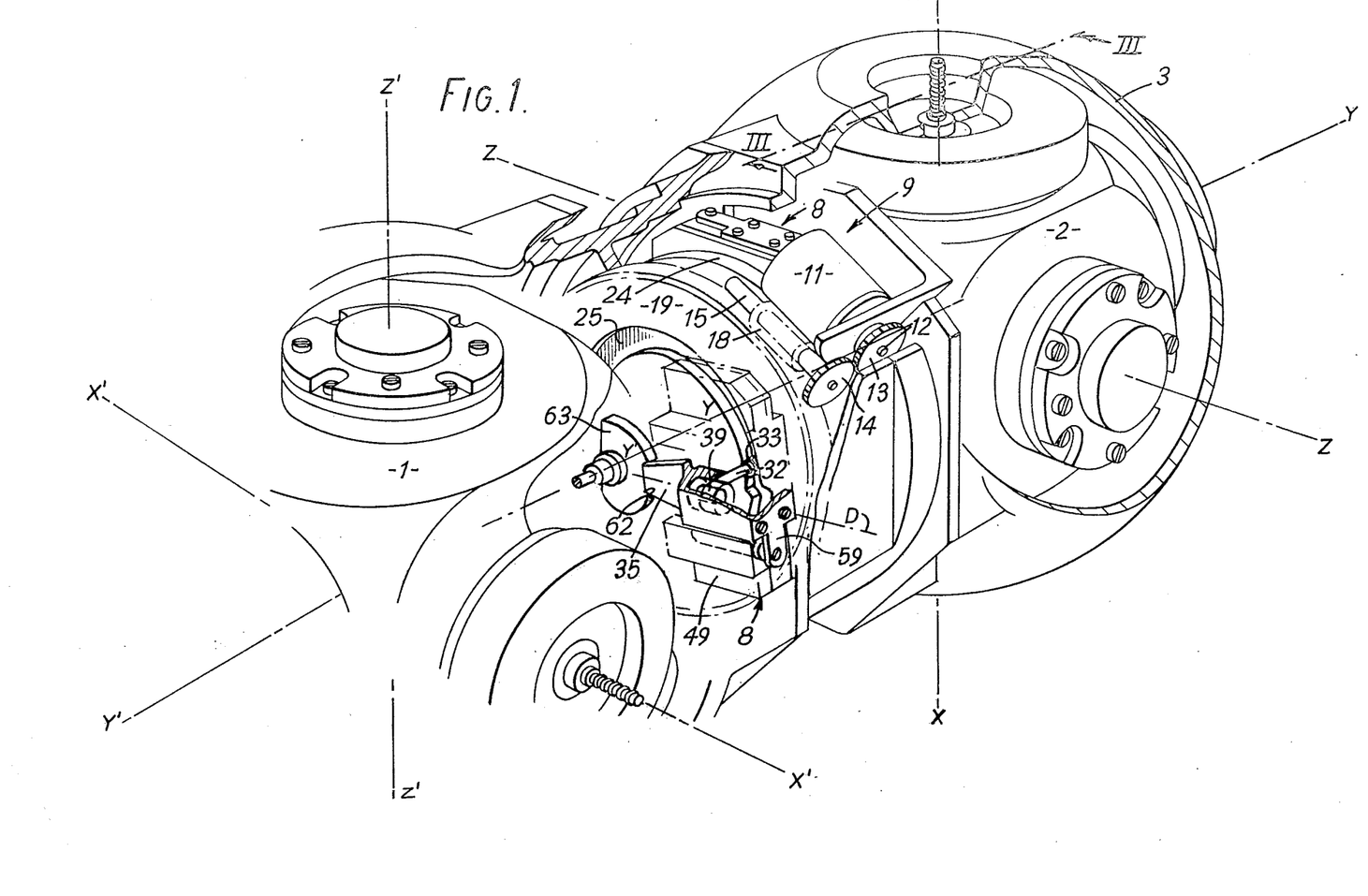
FIG. 1 is a perspective view of the unit with parts removed or broken away.
Figure 2:
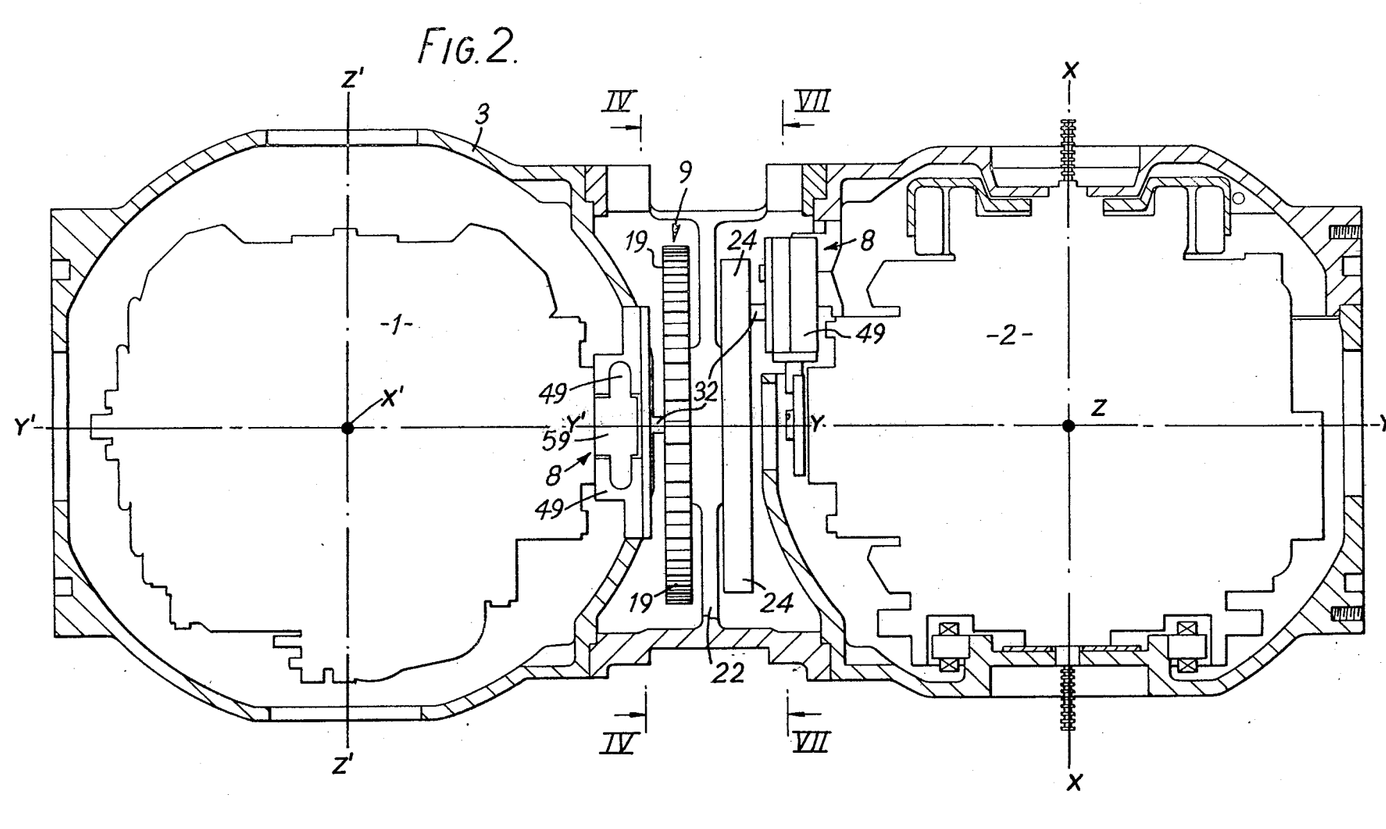
FIG. 2 is a side elevation, partly in section, of FIG. 1.
Figure 3:
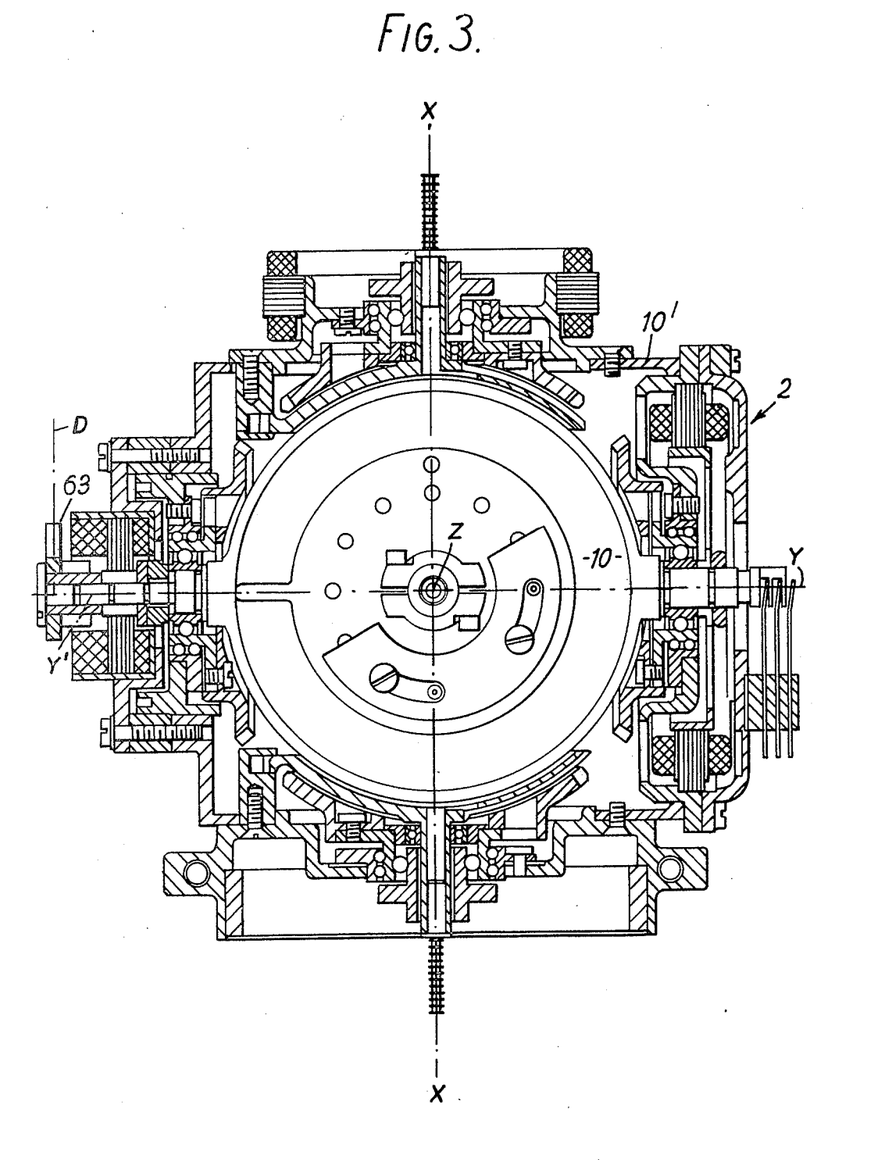
FIG. 3 is a section on the line III—III of FIG. 1 with some parts removed.

The space reference unit shown in FIG. 1 has been designed for use in a missle and includes two two-degree-of-freedom gyroscopes 1 and 2 which generate three axis data have to be caged to an extremely high order of accuracy. The gyroscopes 1 and 2 are mounted in a housing 3 and each have an inner gimbal 10 and an outer gimbal 10' rotatable about mutually orthogonal axes as seen in FIG. 3 which is a section through one of the gyroscopes. The spin axis of the sensitive element in each gyroscope is Z—Z and Z'—Z' respectively. The inner gimbal axes of each gyroscope is Y—Y and Y'—Y' respectively and are aligned as indicated in FIG. 2 and the outer gimbal axis of each gyroscope is X—X and X'—X' respectively, which are mutually orthogonal. The two gyroscopes 1 and 2 are used to generate three-axis data.

Each gyroscope 1 and 2 has a caging mechanism 8 which is shown in greater detail in FIGS. 4 to 11. The caging mechanism 8 acts through the inner gimbal axis Y—Y, Y'—Y'; and parallel to the outer gimbal axis X—X, X'—X'; of the associated gyroscope and this enables a very compact drive arrangement, indicated generally at 9 in FIGS. 1 and 2, to be provided whereby the whole caging device for the unit is compact.

Figure 4:
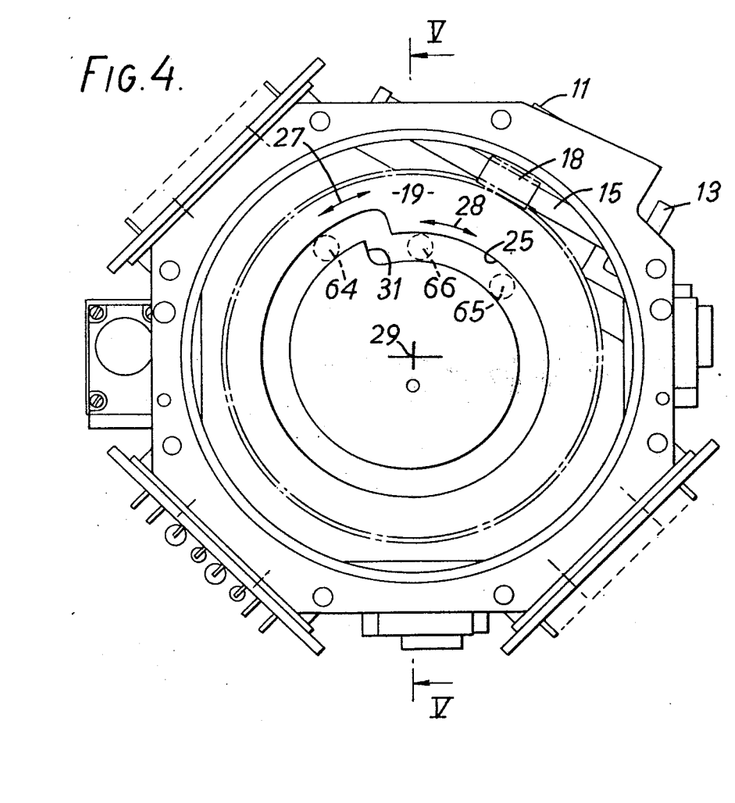
FIG. 4 is a view in the direction of arrows IV—IV of FIG. 2 with certain parts removed.
Figure 5:
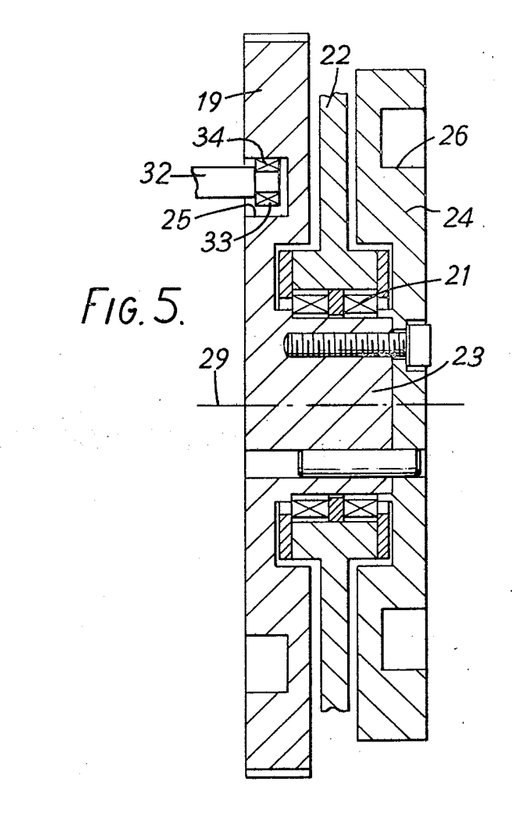
FIG. 5 is a section, to an enlarged scale, on the line IV—IV of FIG. 4.
Figure 6:
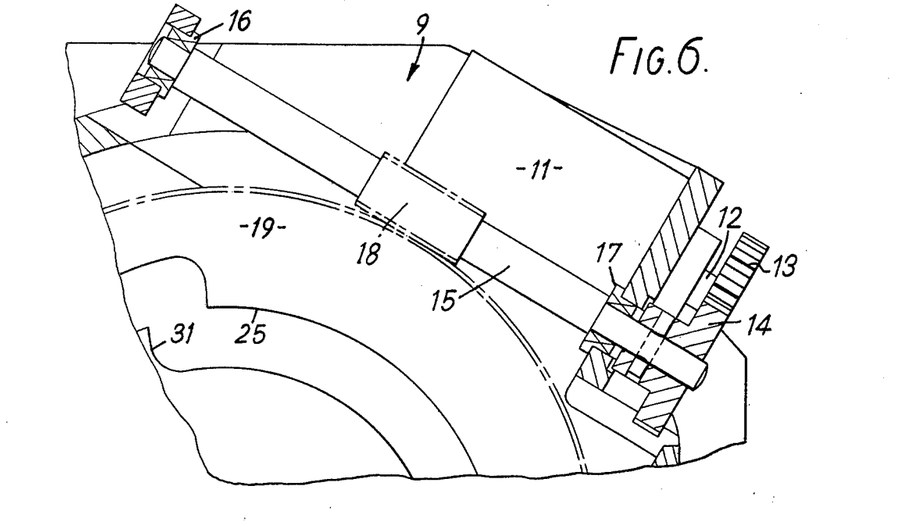
FIG. 6 is a detail of FIG. 4 to a larger scale.

Referring now more particularly to FIGS. 4 to 7, the drive arrangement 9 for the caging mechanims 8 comprises a stepper motor 11 (FIGS. 1 and 6) having an output shaft 12 to which a gear wheel 13 is attached, the gear wheel 13 meshing with a gear wheel 14 attached to one end of a shaft 15 the other end of which is journalled in a bearing 16 (FIG. 5). The shaft 15 is supported in a further bearing 17 towards the end carrying the gear wheel 14 and intermediate its ends the shaft 15 carries a worm gear 18 in mesh with a worm wheel 19. The worm wheel 19 has a hub 23 which is mounted for rotation in a bearing 21 (FIG. 5) disposed in a web 22 forming part of the housing 3. To the hub 23 is bolted a second wheel 24 which thus rotates with the worm wheel 19.

In each of the wheels 19 and 24 there is formed a parallel-sided cam track 25, 26, respectively, in the outwardly-facing surfaces of the wheels, whereby two cams are provided in back-to-back relationship. The two cam tracks 25, 26 are identical although they are 90° out of phase, as seen from FIGS. 4 and 7, for a reason to be described. Each of the tracks 25, 26 comprises two portions 27, 28 of true radius about the centre 29, between which portions is provided a step 31. The remainder of each cam track 25, 27 is of constant rise from the portion 27 to the portion 28. A cam follower 32 is disposed in each of the tracks 25, 26, only one of which is seen in FIG. 5 although both are seen in FIG. 2. A roller 33 is provided at the end of each cam follower 32 for actual engagement with the associated cam track 25, 26, the roller being mounted on a ball race 34 to reduce friction. The clearance between the roller 33 and the associated cam track 25, 26 is of the order of five thousandths of an inch.

Figure 8:
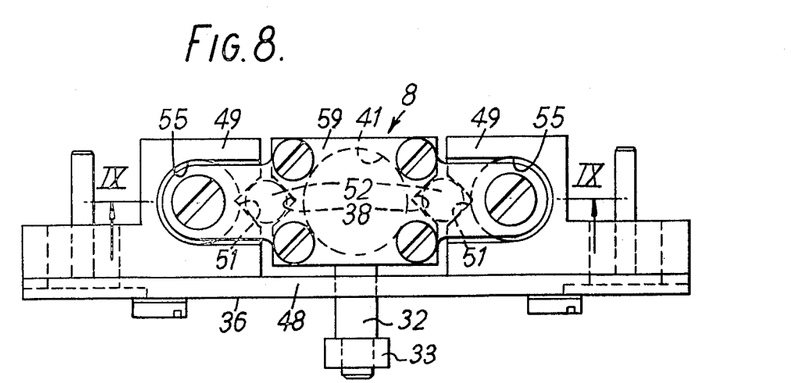
FIG. 8 is a plan view of a detail of FIG. 2.
Figure 9:
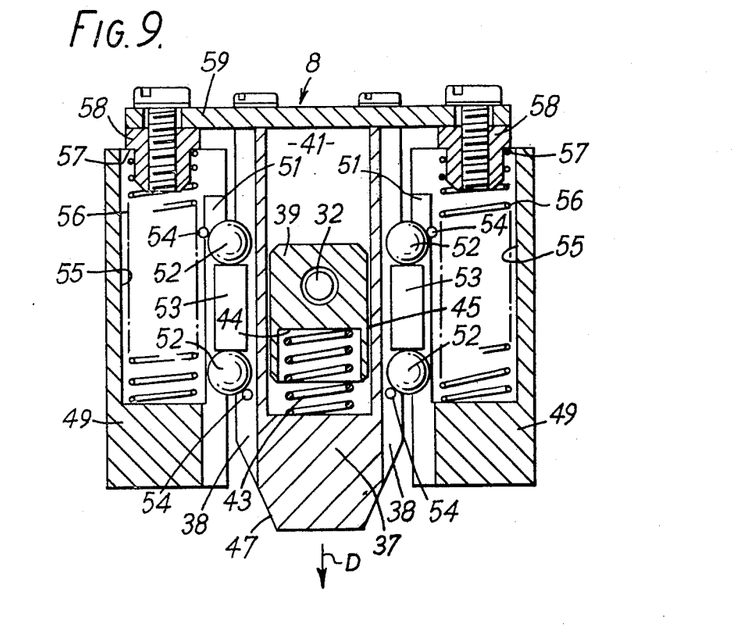
FIG. 9 is a section on the line IX—IX of FIG. 8.
Figure 10:
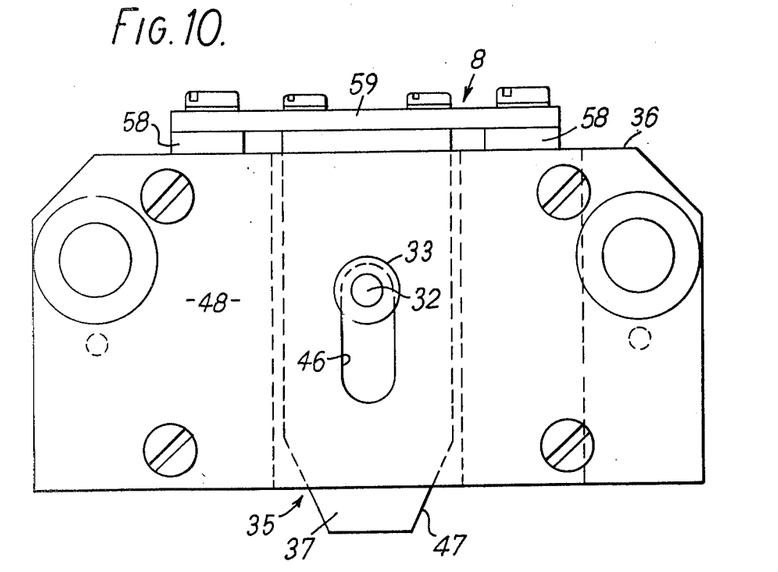
FIG. 10 is a front elevation of FIG. 9.

Turning now to the actual caging mechanisms 8 for the gyroscopes, these are identical and, therefore, only one mechanism will be described, this being shown in more detail in FIGS. 8 to 11 of the drawings. The mechanism 8 comprises a two-part plunger 35 in the form of a linear slide mounted in a housing 36 for limited movement with respect thereto, The plunger 35 has a main body 37 in the form of a rectangular block in opposed sides of which there are formed V-grooves 38 (FIGS. 8 and 9). The two grooves 38 must be formed parallel to one another and this is the only high precision requirement in the manufacture of the mechanism. The other part of the plunger is in the form of a member 39 which is mounted in a circular recess 41 in the main body 37 for movement relative thereto. The member 39 fits closely within the recess 41 for sliding movement therein and has a projection which is the cam follower 32 formed at right angles to the direction of movement of the plunger 35. A resilient mounting for the member 39 is provided in the form of a compression spring 43 which acts between the bottom of the recess 41 and the underside 44 of the member 39, a skirt 45 formed integrally with the member 39 serving to contain the spring. In order to allow relative movement between the member 39 and the main body 37 as regards the cam follower 32, an elongated aperture 46 (FIG. 10) is formed through the main body and housing 36 through which the cam follower extends. The main body 37 is tapered at 47.

The housing 36 is made up of a plate 48 to which are bolted two blocks 49 between which the plunger 35 can slide. The blocks 49 are each formed with a V-groove 51 similar to the V-grooves 38 of the main body 37, each groove 51 being arranged to co-operate with a respective one of the grooves 38. Two ball bearings 52 are provided in each pair of mating grooves 38, 51 with a spacer 53 therebetween and two retaining pins 54. Each block 49 also has a cylindrical recess or bore 55 formed therein in which sits a compression spring 56 of a lower spring rate than the spring 43 associated with the plunger member 39. The spring 56 acts between the bottom of the recess 55 and a shoulder 57 formed on spigot 58 attached to a top plate 59 to which the plunger 35 is bolted.

On assembly of the caging mechanism 8, the ball bearings are preloaded (about 5 lbs.) to prevent any backlash or free play of the plunger 35 transverse to its direction of movement. To this end, the position of each block 49 on the plate 48 is adjustable. The springs 43 and 56 take out or accommodate any backlash, due to build-up of tolerances, in the direction of movement of the plunger 35, whereby the latter is a highly accurate device capable of repeatability as regards caging of the associated gyroscope in a predetermined position. The tapered end 47 of the plunger 35 co-operates with a complementary recess 62 in a disc 63 (FIG. 1) attached to an extension of the inner gimbal 10 of the respective gyroscope, the taper being provided to give a lead-in for the plunger, and the degree of taper being chosen to suit the desired angular range of relative displacement of plunger and recess over which caging may be effected. In the present embodiment, that angular range is 3°. The position of the recess 62 in the disc 63 is chosen to suit the desired relative positions of the inner and outer gimbals of the gyroscope in the caged condition. The line of action D (FIG. 9) of the plunger 35 is through the inner gimbal axes Y—Y, Y'—Y' and parallel to the outer gimbal axes X—X, X'—X' of the associated gyroscope as in this way, no precessional torques are pplied to the gyroscope on withdrawal of the plunger 35 from the recess 62, i.e., on uncaging of the gyroscope. Also, the one caging mechanism serves to cage both the inner and outer gimbals 10, 10' of the associated gyroscope. Since the outer gimbal axes X—X and X'—X' of the gyroscopes 1 and 2 are orthogonal, then the lines of action D of the plungers 35 of the two caging mechanisms 8 must also be orthogonal, hence the different orientation of the mechanisms as seen in FIGS. 1 and 2 and the 90° phasing of the cam tracks 25, 26. Despite this necessity for the line of actions D of the plungers 35 to be parallel to the respective outer gimbal axes X—X and X'—X', the combined caging device for the two gyroscopes 1 and 2 is still extremely compact.

In use in a missile, the space reference unit is a one-shot device and were it not for a requirement of a test facility, it would be a comparatively simple matter accurately to cage the gyroscopes 1 and 2 on assembly and arrange uncaging at the desired time. However, as it is necessary to test the unit, there is a requirement to check the caging mechanism with the attendant problem that the gyroscopes 1 and 2 have to be recaged to the same order of accuracy as when first assembled. This is achieved in accordance with the invention by the caging mechanism 8.

Figure 7:
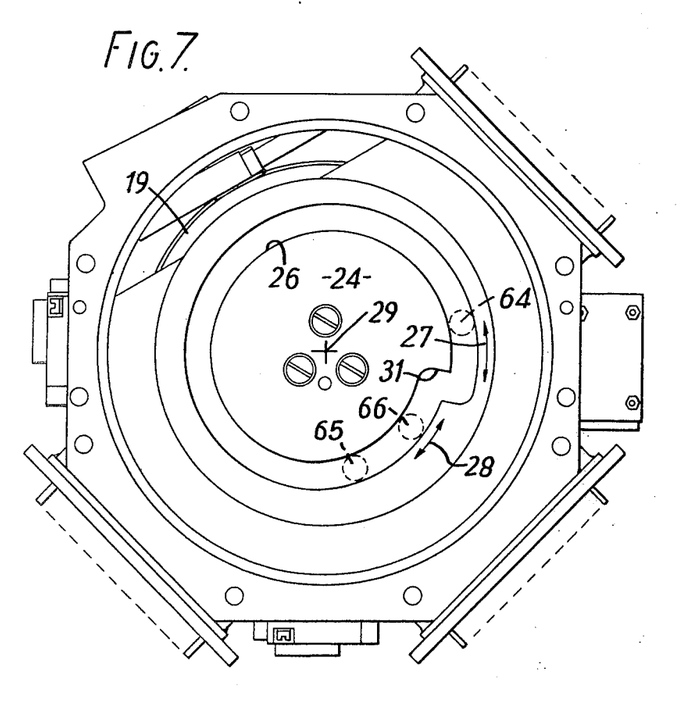
FIG. 7 is a view in the direction of arrows VII—VII of FIG. 2.

Assuming both the gyroscopes 1 and 2 are in the uncaged condition, the cam followers 32 will be in the positions 64 shown in FIGS. 4 and 7, relative to their respective cam tracks 25, 26. If the gyroscopes are now to be caged, they are torqued, using conventional torquer motors (not shown), preferably to within about 1° of the caged positions of the gimbals thereof. The caging mechanisms 8 are then actuated by driving the stepper motor 11, whereby the gear 13 on the output shaft 12 thereof drives the gear 14 and hence the worm 18 which in turn drives the cam wheels 19 and 24. On rotation of the cam wheels 19 and 24, the respective cam followers 32 begin to follow the constant rise portions of the cam tracks 25, 26 with the result that the associated plungers 35 begin to move downwardly as seen in FIG. 8. This movement continues until the followers 32 reach the positions 65 shown in FIGS. 4 and 7 in which the plungers 35 have engaged the respective recesses 62 in the discs 63.

Movement of each plunger 35 between the cam follower positions 64 and 65 referred to is effected through the member 39 which moves in unison with the main body 37. This is because the spring 43 is stronger than the springs 56 so that the latter are compressed, compression continuing until the tapered portion 47 of the plunger 35 engages the shaped recess 62 in the disc 63, a condition reached approximately when the cam followers 32 are at position 65. Although the gyroscopes are now caged, the stepper motor continues to drive the cam wheels 19 and 24 whereupon each plunger 39 now moves relative to the main body 37 against the spring 43. Thus the caging pressure exerted by each plunger 35 is increased by this overtravel and any backlash due to build-up of tolerances is taken out of the mechanism whereby extremely accurate caging is effected; in the space reference unit described, caging to within one minute of arc is achieved. The cam followers 32 are in position 66 at the end of this further movement, i.e., on the portion 28 of the cam track of true radius. In the space reference unit described, the time taken to cage the gyroscopes (from position 64 to 66 of the cam followers 32) is about four seconds. The reason why such precise caging is required is that the gimbal axes X—X, Y—Y, Z—Z, X'—X', Y'—Y' and Z'—Z' are required as accurate angular references immediately when uncaging is effected and the caging mechanism 8 has proved very satisfactory in this connection.

Uncaging takes about 0.1 seconds, the time taken for the cam followers 32 to be driven the short distance from position 66 to the steps 31 in the respective cam tracks 25, 26. When the steps 31 are reached, the plungers 35 snap back to their former uncaged positions under the actions of the springs 56. Caging and uncaging can be repeated as many times as desired without loss in accuracy of the caged positions of the gyroscopes 1 and 2 due to the highly accurate plungers 35. As already mentioned, the uncaging movement of the plungers 35 applies little or no precessional torques to the gyroscopes which is an important feature in missile applications, for example. The use of ball bearings in the plungers 35 and the cam follower rollers 33 reduces friction to a minimum so that fast and reliable uncaging is effected even after a long storage life. If the unit is subjected to shocks or vibration in the uncaged condition of the gyroscopes 1 and 2, the very limited clearance between the cam follower rollers 33 and the cam tracks 25 and 26 means that movement of the plungers 35 is restricted to a very small amount whereby such shocks or vibration cannot result in inadvertent interference with gimbal freedom by the plungers.

It has been found that under vibration conditions the use of a variable reluctance stepper motor for the motor 11 can be unsatisfactory in that rotation of the wheels 19 and 24 may occur. Accordingly, it is preferred to use a stepper motor of the permanent magnet type which prevents this undesired movement of the wheels 19 and 24 under vibration conditions.

Figure 11:
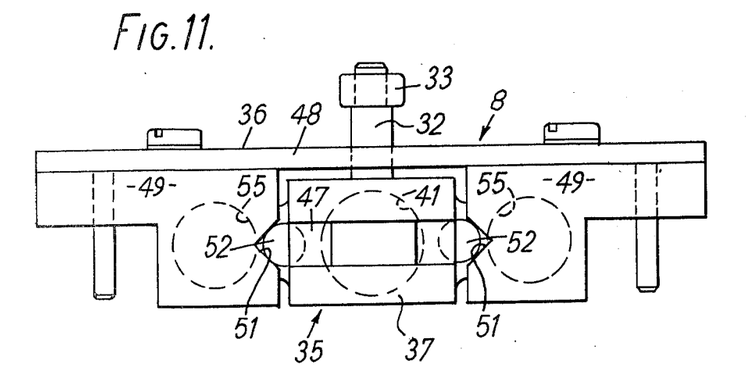
FIG. 11 is a view from beneath of FIG. 8.
Figure 12:
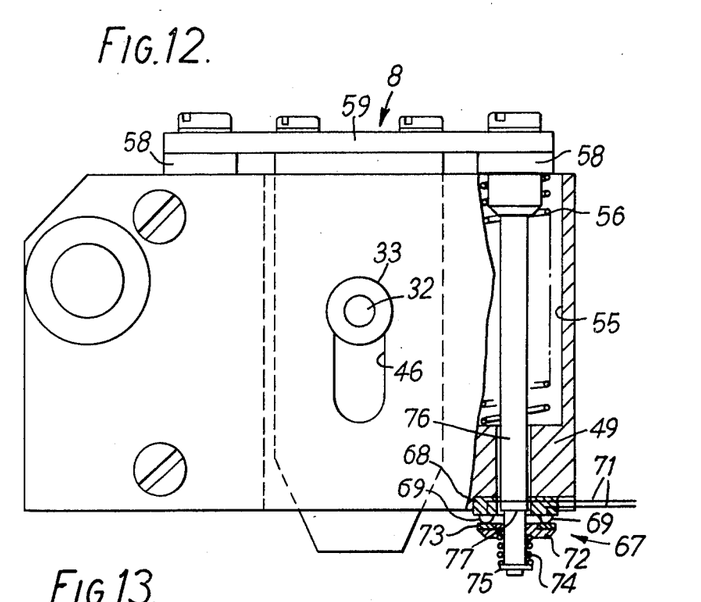
FIG. 12 is a view generally similar to FIG. 10 although partly in section and showing a modification.

If it is desired to have an indication of when the gyroscopes 1 and 2 are caged and uncaged, the caging mechanism 8 may be modified, as illustrated in FIG. 12, to incorporate a limit switch 67. The switch 67 comprises a disc 68 set into one end of part of one block 49 forming part of the housing 36. The disc 68 carries two arcuate electrical contacts 69 to each of which an electrical lead 71 is taken. A second disc 72 carrying an annular electrically-conductive strip 73 is urged towards and engagement with the contacts 69 by a spring 74 acting between the disc 72 and a shoulder 75 on a rod 76 which passes through both the discs 68 and 72. The strip 73 shorts the contacts 69 when in contact therewith and this represents the switch closed position as seen in FIG. 11. The rod 76 is carried by one of the spigots 58 and is formed with another shoulder 77.

On movement of the plunger 35 to the caged position, the rod 76 moves downwardly as seen in FIG. 12 but contact between the strip 73 and the contacts 69 is not broken until the shoulder 77 engages the disc 72. This overtravel again accommodates any build-up in tolerances. Once the disc 72 is engaged by the shoulder 77, it is moved away from the contacts 69, whereupon the switch is opened. Thus the switch closed condition indicates that the associated gyroscope is uncaged, and the open condition that the gyroscope is caged. The coaxial arrangement of the two disc elements 68 and 72 of the switch and the overtravel feature make the switch particularly advantageous for the space reference unit described.

Figure 13:
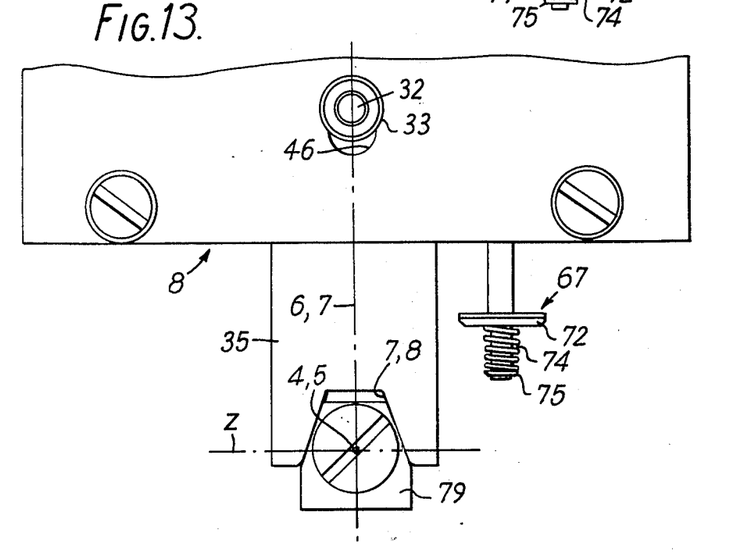
FIG. 13 shows a modification for part of FIG. 1.

It has been found that precession torques generated at high angular rotation rates about one or other of the inner gimbal axes Y—Y, Y'—Y' with the sensitive elements running tends to force the plunger 35 associated with the gyro concerned out of engagement with the recess 62 in the disc 63 causing unintentional uncaging of the gyro. To overcome this problem, a plunger 35 having a tapered slot 78, giving a forked end to the plunger, may be used together with a disc 79 in the shape of a wedge as shown in FIG. 13. With this arrangement, the plunger 35 engages the disc 79 over a greater distance than in FIG. 1 and, more particularly, the line of engagement on each side of the disc extends beyond the spin axis Z—Z or Z'—Z' of the associated gyro which passes through the disc, thereby avoiding the problem of unintentional uncaging referred to above. Again, the taper of the slot 78 and the disc 79 provides the necessary plunger lead-in and the degree of taper is chosen to suit the desired angular range over which caging can be effected. Only part of the switch 67 is seen in FIG. 13 as in this modification the contacts 69 are recessed into the body of the plunger.

What we claim is:

1. In a gyroscopic apparatus including at least one two-degree-of-freedom gyroscope having an outer case, a sensitive element mounted in an inner gimbal rotatable about an axis and an outer gimbal rotatable about an axis orthogonal to the inner gimbal axis, an improved caging mechanism for said inner and outer gimbal comprising,
   a releasably operable plunger oriented within an attached to said outer case and movable along a line that passes through the inner gimbal axis and is parallel to the outer gimbal axis, and
   inner gimbal extension means positioned along the inner gimbal axis for coacting with said plunger whereby said plunger engages said extension means thereby accurately caging said inner and outer gimbals simultaneously in a specified position.

2. In a gyroscopic apparatus including an improved caging mechanism as recited in claim 1, an inner gimbal extension means having a recess formed therein at a predetermined position for receiving said plunger whereby said inner and outer gimbal have a desired orientation in said caged position.

3. In a gyroscopic apparatus having an improved caging mechanism as recited in claim 2 wherein said plunger includes a tapered portion for providing a lead-in for said plunger to engage said recess which has a correspondingly shaped taper whereby the degree of taper determines the desired angular range of relative displacement between said plunger and said recess over which caging may be effected.

4. In a gyroscopic apparatus having an improved caging mechanism as recited in claim 20 further including housing means fixed with respect to said outer case, said plunger being in the form of a slide means disposed in said housing means,
   first resilient mounting means disposed between said slide means and said housing means for allowing movement of said slide means relative to said housing means, and
   actuator means coupled to said slide means for displacing said slide means relative to said housing means along a line passing through said inner gimbal axis and parallel to said outer gimbal axis to engage said extension means thereby caging said inner and outer gimbals.

5. In a gyroscopic apparatus having an improved caging mechanism as recited in claim 4 in which said slide means further includes
   a movable member mounted within said slide means and coupled to said actuator means, and
   second resilient mounting means disposed between said slide means and said movable member for allowing said movable member to be displaced with respect to said slide means and said housing means whereby the caging pressure exerted upon said slide means engaged within said recess of said extension means is increased.

6. In a gyroscopic apparatus having an improved caging mechanism as recited in claim 4 further including preloaded bearings disposed between said slide means and said housing means for eliminating backlash transverse to the direction of movement of said slide.

7. In a gyroscopic apparatus having an improved caging mechanism as recited in claim 4 in which said actuator means includes a cam having a cam track and said slide means includes a projection which coacts with said cam track for serving as a cam follower to displace said slide means with respect to said housing means.

8. In a gyroscopic apparatus having an improved caging mechanism as recited in claim 7 in which said cam includes a parallel-slided cam track.

9. In a gyroscopic apparatus having an improved caging mechanism as recited in claim 8 in which said cam further includes a cam track having two spaced portions of true radius about the center of said cam, a stepped portion located between adjacent ends of said true radial portions and a remaining portion of said cam track disposed between opposite ends of said true radial portions having a constantly increasing radius.

10. In a gyroscopic apparatus having an improved caging mechanism as recited in claim 4 in which said actuator means further includes drive means comprising
    a worm wheel,
    a worm gear cooperative with said worm wheel,
    a gear train coupled to said worm gear, and
    an electric motor coupled to said gear train for driving said cam through the co-action of said gear train, said worm gear and said worm wheel whereby said slide engages said extension means.

11. In a gyroscopic apparatus having an improved caging mechanism as recited in claim 10 in which said electric motor means includes a stepper motor.

12. In a gyroscopic apparatus having an improved caging mechanism as recited in claim 11 in which said stepper motor includes a permanent magnet type stepper motor.

13. In a gyroscopic apparatus including an improved caging mechanism as recited in claim 1 in which said improved caging mechanism further includes an electrical switch means coupled to said releasably operable plunger comprising
   a first member including a pair of electrical contacts,
   a second member including an electrically conductive strip operable to short said pair of contacts in the switched closed position and biased to this latter position, and member being mounted, said second member being mounted on
   a third member for movement toward and away from said first member, whereby in moving from the switch closed to the switch open position, said third member moves relative to both said first and second members, subsequently engages said second member moving it away from said first member thereby opening the switch for providing a visual indication when said plunger means engages said extension means.

14. In a gyroscopic apparatus including an improved caging mechanism as recited in claim 13 in which said pair of contacts includes a pair of arcuate shaped contacts.

15. In a gyroscopic apparatus including an improved caging mechanism as recited in claim 13 in which the switch means is coupled to said plunger and said third member comprises a rod having a shoulder for engaging said second member to effect movement of said second member away from said first member.

16. In a gyroscopic apparatus including an improved caging mechanism as recited in claim 15 in which said second member includes a disc shaped member and said electrically conductive strip is annular in shape.

17. In a gyroscopic apparatus including two two-degree-of-freedom gyroscopes having an outer case, wherein each gyroscope includes a sensitive element mounted in an inner gimbal rotatable about an axis and an outer gimbal rotatable about an axis orthogonal to the inner gimbal axis and the inner gimbal axes are aligned, an improved caging mechanism for said inner and outer gimbals comprising
   a pair of releasably operable plunger means each including
      housing means fixed with respect to said outer case,
      slide means disposed in said housing means,
      first resilient mounting means disposed between said slide means and said housing means for allowing movement of said slide means relative to said housing means,
      actuator means including a cam coupled to said slide means for displacing said slide means relative to said housing means along a line passing through said inner gimbal axis and parallel to said outer gimbal axis, and
   inner gimbal extension means positioned along said inner gimbal axis for coacting with said slide means whereby said slide means engages said extension means thereby accurately caging simultaneously said inner and outer gimbals of said respective gyroscopes in specified positions.

18. In a gyroscopic apparatus having an improved caging mechanism as recited in claim 17 wherein said cams associated with said respective gyroscopes are mounted in back-to-back relation and a common drive mechanism is employed to rotate said cams.

19. In a gyroscopic apparatus as recited in claim 18 in which said outer gimbal axes of said respective gyroscopes are mutually orthogonal, each of said cams includes a cam track having two spaced portions of true radius about the center of said cam, a stepped portion located between adjacent ends of said true radial portions and a remaining portion of said cam track disposed between opposite ends of said true radial portions having a constantly increasing radius, and said cam tracks of said respective cams are 90° out of phase with each other.

20. In a gyroscopic apparatus having an improved caging mechanism as recited in claim 18 in which said cams are drivingly connected to each other and said common drive means includes a worm gear, a gear train, a worm wheel integral with one of said cams, and an electric drive motor for synchronously driving said cams through the co-action of said gear train, said worm gear and said worm wheel whereby said slides engage said respective extension means.

* * * * *